United States Patent [19]

Eisner et al.

[11] 4,045,356

[45] Aug. 30, 1977

[54] FRACTURING AGENT

[75] Inventors: Steve Eisner; James LeRoy Powell, both of Seattle, Wash.

[73] Assignee: The Boeing Company, Seattle, Wash.

[21] Appl. No.: 290,237

[22] Filed: June 24, 1963

[51] Int. Cl.$^2$ .............................. B26F 3/00; C22C 7/00
[52] U.S. Cl. .................................. 225/2; 75/169; 148/6.11
[58] Field of Search ............... 148/22, 4, 6, 6.27, 148/6.11; 156/18; 117/130; 83/1; 75/169; 252/2

[56] References Cited

U.S. PATENT DOCUMENTS

| | | | |
|---|---|---|---|
| 2,523,789 | 9/1950 | Teare | 75/169 X |
| 2,829,950 | 4/1958 | Cunningham | 75/169 X |
| 3,054,938 | 9/1962 | Meddick | 102/24 HC X |
| 3,181,848 | 5/1965 | Miller | 75/169 X |
| 3,254,996 | 6/1966 | MacDonald | 75/206 |

*Primary Examiner*—Richard E. Schafer

*Attorney, Agent, or Firm*—Kenneth W. Thomas

[57] ABSTRACT

Fracture promoting media are comprised of mercury and an alkali metal selected from the group consisting of cesium, lithium, sodium and potassium. A modification of the foregoing media is achieved by the addition of a metallic sulfate solution selected from the group of gold sulfate, silver sulfate and copper sulfate. A method of achieving failure of a material at greatly reduced energy requirements comprises contacting the material at a desired place for failure with a medium of mercury and an alkali metal selected from the group of cesium, lithium, sodium and potassium and applying force to the material. A modification of the foregoing method comprises contacting the material at a desired place for failure with a medium of mercury, an alkali metal selected from the group of cesium, lithium, sodium and potassium and a metallic sulfate solution selected from the group of gold sulfate, silver sulfate and copper sulfate and applying a force to the material.

17 Claims, No Drawings

FRACTURING AGENT

This invention relates to fracturing media for materials and more particularly to methods of reducing the strength properties of materials facilitating their failure under greatly reduced loads.

Prior to this invention there was no known fracturing agent for use on ferrous materials except at high temperatures. Fracturing agents have been found for other materials, such as aluminum and aluminum-base materials. Therefore the main purpose of this invention was to achieve a fracturing agent for ferrous materials.

Presently demolition work encounters many facilities to be disassembled for further progress in making way for new facilities of greater potential, and when it is realized that a great part of many of these facilities are ferrous materials, it is obvious that there is a pressing problem in this industry to efficiently demolish ferrous facilities. It would be a welcomed addition to the demolition work to have a demolition agent which facilitates fracturing iron and steel materials. Since the media of the present invention can be encapsulated, they could be easily stored until used.

Another demanding need for a fracturing product for ferrous materials is in the metalworking industry. Often intricate shapes and complex designs present formidable machining and cutting problems for ferrous products either requiring (1) a specially designed machine for cutting, (2) a special forming method, or (3) a fracturing agent similar to the present invention. The first method entails a great deal of time and expense and is unsatisfactory where there is a limited number of parts requiring such operations. The second method also entails expense that cannot be justified for operations involving a few parts. It is felt that the third method presents an inexpensive, satisfactory solution. For example, a marking device could be used to put the fracturing agent in a precise fine line. Then, after allowing time for the fracturing agent to work its change on the ferrous material, a pressure could be applied to the part which, because of its greatly reduced strength properties, would fail.

In its broadest sense this invention consists of a fluid medium which facilitates contacting the surface of the aluminum alloys, titanium alloys, copper-base alloys, iron alloys and steels to be fractured and a reactant which in the presence of water operates on the above materials to physically alter the properties of these materials. Usually from the time of contacting any of the above materials to the result of an appreciable drop in the strength properties is a matter of around 10 minutes with time variations between 5 and 15 minutes depending on the means of applying the fracturing agent and the surface condition of the above materials.

Particular embodiments of this invention are the following fracturing agents:

| Fracturing Agent | Reactant | Fluid Medium |
|---|---|---|
| Sodium amalgam | sodium | mercury |
| Potassium amalgam | potassium | mercury |
| Cesium amalgam | cesium | mercury |
| Lithium amalgam | lithium | mercury |

In addition to these systems we have found that contacting of the ferrous material's surfaces is improved if prior to applying the alkali amalgam, one applies a copper sulfate, gold sulfate or silver sulfate solution. These solutions can be applied separately prior to application of the alkali amalgam and can be kept in separate capsules or containers for such application. The solutions leave a copper, gold or silver immersion coating respectively, on the steel materials. The improvement is so pronounced that we have a second set of embodiments of this invention in which at least 1% of metallic sulphate solution is added to the fracturing agent as follows:

| Fracturing Agent | Reactant | Fluid Medium |
|---|---|---|
| Sodium amalgam | sodium | mercury + copper sulfate, silver sulfate or gold sulfate |
| Potassium amalgam | potassium | mercury + copper sulfate, silver sulfate or gold sulfate |
| Cesium amalgam | cesium | mercury + copper sulfate, silver sulfate or gold sulfate |
| Lithium amalgam | lithium | mercury + copper sulfate, silver sulfate or gold sulfate. |

The remarkable results of the ferrous fracturing agent are demonstrated by the following results:

| Material | Treatment | % Fracture Stress Reduction |
|---|---|---|
| 4340 M steel | untreated | 0% |
| 4340 M steel | 1% alkali amalgam | 30% (average) |
| 4340 M steel | copper immersion coat + alkali amalgam | 50% (average) |
| 4340 M steel | silver immersion coat + alkali amalgam | 75% (average). |

In addition to the above results, one specific example will be described which used 4330 steel. This material, as used, usually has a tensile fracture strength of 225,000 psi, approximately. But after the application of one of the alkali amalgams to a small limited area of the surface of the steel perpendicular to the line of force application with time being allowed for the effect of the solution, the steel fractured at 120,000 psi tension. The length of time varies for this reaction to occur with 7 minutes being a normal time. This phenomena occurs at ordinary room temperature and pressure.

The order of applying the alkali amalgam or the copper, gold or silver sulfate immersion coating is not critical. Any method which places some of the materials of the instant invention in proximity with the desired marking configuration on the surface of the aluminum alloy, titanium alloy, copper-base alloy, iron alloy or steel material is sufficient.

The aqueous copper sulfate, silver sulfate and gold sulfate solutions operate in the range of 0.0001N to a saturated solution at room temperature. The saturated solutions are preferred in this invention, but all others are operative. The gold solution may be used in methanol medium instead of a water medium.

The liquid alkali amalgams are synthesized in the following manner. The alkali metal is heated until liquid under a protective layer of oil. Mercury is added slowly until the desired percentage is present. The alkali metal is added directly to the mercury. The liquid alkali-amalgams have the variable ranges of 0.2 to 2% of alkali in mercury.

In addition to producing a reduction of strength properties for ferrous materials, the alkali amalgams also reduce the strength properties of aluminum alloys, titanium alloys and copper-base alloys so that these same alkali metal amalgams are successful fracturing agents for aluminum, titanium and copper-base alloys.

The phenomena of the instant invention can be best thought of as a hydrogen embrittling action combined with a reduction of surface energy on the material subjected to the reaction. In the case of aluminum or other non-ferrous metals and alloys only the surface energy reduction is important since these metals are not subject to the influence of hydrogen embrittlement.

The hydrogen for this reaction is obtained from the reaction of the sodium in the fracturing agent with the water vapor of the air or with any added source of water (e.g., the silver sulfate solution). The mercury acts as a one-way valve which allows hydrogen to enter the steel but hinders its escape. This causes a build-up of hydrogen concentration in the steel, which in turn facilitates embrittlement and fracture at relatively low stress levels. The mercury probably facilitates crack propagation by following the crack as it is formed and decreasing the surface energy and hence allows atomic bonding at the crack root by a chemisorption reaction. The copper, silver or gold immersion coatings serve to produce better surface contact between the metal and the amalgam.

The reason the silver, copper and gold sulfate solutions give better contact with the surface is that these elements amalgamate more easily with mercury than iron does. Where steel is wetted by one of these materials, a replacement reaction occurs, in which either gold, silver or copper is intimately deposited on the iron. The resulting contact between mercury with the gold, silver or copper gives an increased wetting of the element by the mercury. This will allow the mercury carrying the hydrogen to come into intimate contact with the surface. This in turn facilitates hydrogen transfer into the steel with subsequent hydrogen embrittlement and weakening of the steel.

We claim:

1. A fracturing solution for aluminum alloys, titanium alloys, copper-base alloys, iron alloys and steels comprising a first component of 98% to 99.8% mercury and 2% to 0.2% alkali metal selected from the group consisting of sodium, cesium potassium, and lithium and a second component of at least 1% of at least 0.0001N metallic sulfate solution selected from the group consisting of gold sulfate, copper sulfate and silver sulfate.

2. A fracturing composition as set forth in claim 1 wherein the metallic sulfate is gold sulfate.

3. A fracturing composition as set forth in claim 1 wherein the metallic sulfate is copper sulfate.

4. A fracturing composition as set forth in claim 1 wherein the metallic sulfate is silver sulfate.

5. A fracturing composition as set forth in claim 1 wherein the alkali metal is sodium.

6. A fracturing composition as set forth in claim 1 wherein the alkali metal is cesium.

7. A fracturing composition as set forth in claim 1 wherein the alkali metal is potassium.

8. A fracturing composition as set forth in claim 1 wherein the alkali metal is lithium.

9. A method of altering the strength properties of aluminum alloys, copper-base alloys, titanium alloys, iron alloys and steels comprising coating the materials with a composition of mercury and an alkali metal selected from the group consisting of sodium, cesium, potassium and lithium, said alkali metal having a variable range of 0.2 to 2% and the balance being mercury.

10. The metal set forth in claim 9 wherein the composition has an additional component of at least 1% of at least a 0.0001N metallic sulfate solution selected from the group consisting of gold sulfate, copper sulfate and silver sulfate.

11. A method of fracturing materials comprising the steps of (1) coating the materials in the area in which a fracture is desired with a composition of an alkali metal selected from the group consisting of sodium, cesium, potassium and lithium, said alkali metal having a variable range of 0.2 to 2% and the balance being mercury and (2) applying force to the materials.

12. The method set forth in claim 11 wherein the composition has an additional component of at least 1% of at least a 0.0001N metallic sulfate solution selected from the group consisting of gold sulfate, copper sulfate and silver sulfate.

13. A method of embrittling iron containing materials through the introduction of hydrogen into the materials comprising coating the materials with a composition of mercury and an alkali metal selected from the group consisting of sodium, cesium, potassium and lithium, said alkali metal having a variable range of 0.2 to 2% and the balance being mercury.

14. The method according to claim 13 wherein is practiced the subsequent step of applying force to the materials.

15. The method according to claim 13 wherein the composition has an additional component of at least 1% of at least 0.0001N metallic sulfate solution selected from the group consisting of gold sulfate, copper sulfate and silver sulfate.

16. The method according to claim 15 wherein is practiced the subsequent step of applying force to the materials.

17. The method according to claim 15 wherein said metallic sulfate solution component is separately applied.

* * * * *